Aug. 10, 1965      R. A. RICHARDSON ETAL      3,200,337
FREQUENCY STANDARD
Filed Oct. 15, 1962
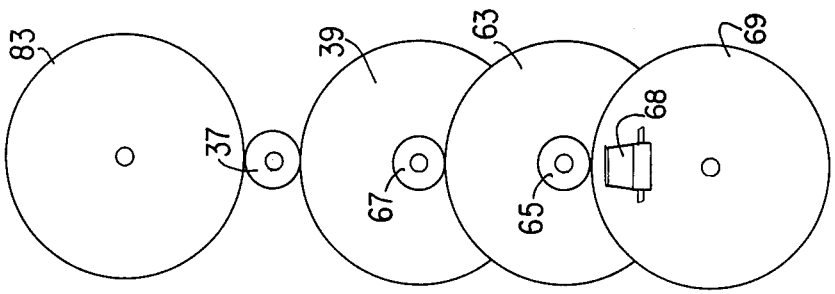
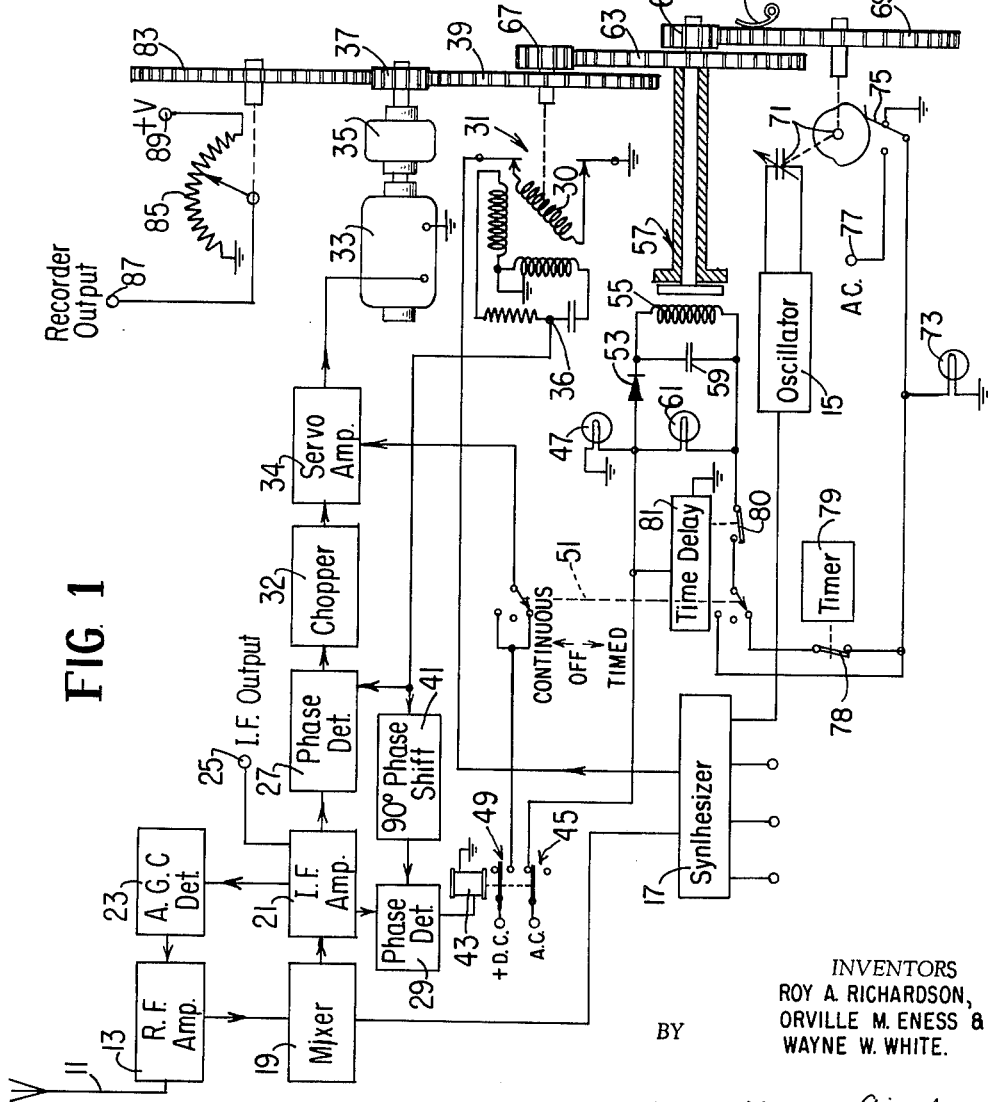
INVENTORS
ROY A. RICHARDSON,
ORVILLE M. ENESS &
WAYNE W. WHITE.
BY
Mueller and Aichele ATTYS.

United States Patent Office 3,200,337
Patented Aug. 10, 1965

3,200,337
FREQUENCY STANDARD
Roy A. Richardson, Skokie, Orville M. Eness, Norridge, and Wayne W. White, Hillside, Ill., assignors to Motorola, Inc., Chicago, Ill., a corporation of Illinois
Filed Oct. 15, 1962, Ser. No. 230,398
6 Claims. (Cl. 325—420)

This invention relates to very low frequency receiver frequency standard units and more particularly to one which has an automatic frequency control system which operates only when the received signal and the locally generated signal are in a given relationship, and only during predetermined periods of time.

It is known to utilize a signal broadcast from such stations as NBA (18 kc.), located at Balboa in the Panama Canal Zone, or other stations in the very low frequency (VLF) range, such as WWVL (20 kc.) and WWVB (60 kc.) in Boulder, Colorado, and GBR (16 kc.) in Rugby, England, to control the frequency of a locally generated standard and thereby maintain very high accuracy. The two former stations provide coverage for the entire United States while GBR does the same for Europe. All of these stations transmit with very high accuracy. The received accuracy of these transmitted signals is further enhanced by their operation in the very low range of the frequency spectrum, where propagation characteristics are more highly favorable to this degree of accuracy as compared to operation at higher frequencies.

When the transmitter site and the receiver site are either both in sunlight or both in darkness, the transmission path remains substantially constant. However, the path length changes between sunlight at both sites and darkness at both sites due to the fact that during the day, the sun lowers the ionosphere which is reflecting the signal. The layer drops rapidly when illuminated by the sun and usually rises slowly during the night. This change in path length results in a change in phase shift between the two sites. If continuous AFC correction based on phase comparison is used, the frequency of the receiver will be changed during the transition period. Thus, during the diurnal shift the output frequency of the unit will vary because of the resulting phase shift, introducing a transient condition in the automatic frequency control system.

Certain other factors can introduce transient conditions in the automatic frequency control system. For example, the transmitter may be temporarily shut off for a relatively lengthy period of time, such as is presently the case with NBA on Wednesday mornings; or the signal may not be transmitted at certain relatively short intervals, such as again is the case with NBA which is off for three minutes every hour. If automatic frequency control correction is maintained during such occurrences, noise and ambient signals will drive the unit far off frequency. Furthermore, if the phase tracking function of the unit is suspended during periods of non-reception to avoid the effects of noise and ambient signals, when reception is resumed and if the phase is slightly off, the system must track the phase of the incoming signal to re-establish a proper phase relationship. This will cause the frequency of the locally generated signal to wander.

Accordingly, it is an object of this invention to provide an improved VLF receiver frequency standard unit which provides highly accurate source of oscillations under all normal operating conditions.

A further object is to provide a VLF receiver frequency standard unit in which automatic frequency control will take place only when phase lock has been established with the incoming signal.

Another object of the invention is the provision of a VLF receiver frequency standard unit in which automatic frequency control may be automatically prevented during the diurnal shift.

Still another object of the invention is to provide a VLF receiver frequency standard unit in which the output frequency will remain steady during periods of non-reception and will not enter a transient condition when reception is resumed.

A feature of the invention is the provision of a VLF receiver frequency standard unit including a phase tracking servo system and a clutch connecting the servo system to a frequency control device for the local oscillator.

Another feature of the invention is the provision, in the above described device, of a quadrature detector for controlling operation of the clutch to engage same only when a phase lock has been established.

Still another feature of the invention is the provision, in a VLF receiver frequency standard unit, of a timer to turn off the automatic frequency control at preselected times.

A still further feature of the invention is the provision of a VLF receiver frequency standard unit including a delay device to prevent automatic frequency control for a given length of time after resumption of reception of the signal from the transmitter, to permit a given phase relationship to be re-established.

Attention is directed to the drawings wherein:
FIG. 1 is a schematic diagram of a VLF receiver frequency standard unit constructed in accordance with the invention; and
FIG. 2 is a plan view of the gear train of FIG. 1.

In general, the invention comprises a VLF frequency standard unit which provides a source of frequency with constant accuracy according to the frequency of a signal standard from a transmitting station. The accuracy is maintained by an electronic servo system which automatically adjusts the frequency of a master oscillator to the same frequency as a received signal. A clutch is provided between the oscillator adjustment and the servo system to permit disengagement of the automatic frequency control. A detector is provided to de-energize the clutch upon the loss of the received signal to prevent the frequency from being driven off due to noise signals, etc. A timer device is connected in the clutch circuit, and may be pre-set to disengage the clutch during the diurnal shift. In addition, a time delay device may be connected in the clutch circuit to delay the resumption of automatic frequency control after a period of break in the received signal until the proper phase relationship is established with the local oscillator.

Referring now to the drawing, a representation of a VLF receiver frequency standard unit is depicted schematically. Incoming signals from a transmitter, such as the transmitter of station NBA, or similar VLF transmitters which maintain a very exact frequency standard, are received at antenna 11 and amplified in radio frequency (RF) amplifier 13. At the same time signals from a local oscillator 15, which is a highly stable unit, are synthesized to a desired frequency by synthesizer 17, and then applied to mixer 19, where they are heterodyned against the incoming signals as amplified by the RF amplifier 13, to produce an intermediate frequency (IF) output. The synthesizer may also have output connections for various other output frequencies synthesized from the oscillator output.

These IF signals are amplified in IF amplifier 21, which then sends amplified IF signals to four different locations. Some signals are sent to AGC detector 23, which provides automatic gain control for the radio frequency amplifier 13. IF signals are sent to IF output jack 25, which may be located in a convenient place on the housing of the unit. Amplified IF signals are also applied to phase detectors 27 and 29.

Returning for the moment to synthesizer 17, an output signal of the intermediate frequency of the mixer output is produced from the output of the basic oscillator 15 and applied to the rotatable coil 30 of a phase resolver 31. Phase resolver 31 may be of the type supplied by Daystrom Transcoil Corporation, model No. U–207025–5–1–8. The output of phase resolver 31, still at the intermediate frequency, is applied from terminal 36 to phase detector 27.

Phase detector 27 is of the type well known in the art which provides a direct current output, the polarity and magnitude of which is determined by the phase relation of the two incoming A.C. signals. The D.C. output of phase detector 27 is converted to A.C. in chopper 32, amplified in servo amplifier 34, and applied to drive servo motor 33. Servo motor 33 may be model No. U–204726–19–3–3 made by Daystrom Transcoil Corporation. Servo motor 33 is mechanically coupled through gear reduction unit 35, to drive a gear train through drive gear 37. The unit 35 may be model A–104A of Planet Instrument, Inc., which has a ratio of 11,398.74 to 1. Gear 37 drives gear 39 at about a 3.47 to 1 reduction, and gear 39 is mechanically coupled to drive the rotatable coil 30 of phase resolver 31, thus shifting the phase according to the output of phase detector 27. Through this arrangement the servo system tracks the phase of the intermediate frequency signal derived from the mixer, and adjusts the phase of the signal from the synthesizer to establish a given phase relationship such that the output of phase detector 27 is zero.

A portion of the reference signal at intermediate frequency from terminal 36 of the phase resolver is shifted 90° in a phase shifter 41 and applied to phase detector 29. When the phase of the intermediate frequency signal derived from the transmitted signal and the phase of the signal of intermediate frequency from the synthesizer are within a predetermined range of the given relationship, the 90° phase shift will cause phase detector 29 to provide an output sufficient to energize relay 43. This actuates switch 45 to cause A.C. current to flow through lock light 47. Lock light 47 may be placed on the exterior of the standard to indicate when a phase lock as determined by phase detector 29 has been established.

Energization of relay 43 also serves to open switch 49. When switch 49 is in closed position, and assuming panel switch 51 is in either continuous or timed position as will be explained, D.C. current is provided to servo amplifier 34 to provide cut-off bias therefor. Thus servo amplifier 34, and hence the servo system, will not operate unless a phase lock as determined by phase detector 29 exists. If the transmitted signal is not being received, phase detector 29 prevents operation of the servo system so that noise and transient signals will not drive the phase resolver 31. Thus, when receiving is resumed, the phase resolver 31 will be on or relatively close to the proper position. The described bias circuit thus solves the problems arising from periods of non-reception, for example, as in the case of station NBA which is off for three minutes every hour.

Alternating current through switch 45 is also applied through diode 53 to an actuating coil 55 for clutch 57. Clutch 57 may be of the type supplied by Magrol, Inc., model No. FC–109. Filter capacitor 59 and diode 53 provide a means for obtaining D.C. current from an A.C. source in order to activate clutch 57. AFC light 61 is provided across the coil 55 to indicate when the coil is energized. Clutch 57 is adapted to couple gears 63 and 65. Gear 63 is driven by gear 67 at a 5 to 1 reduction and gear 67 is coupled to the same shaft as gear 39, and hence linked to the servo motor through gear 37 and gear reduction unit 35. Gear 69 is driven by gear 65 at a 5 to 1 reduction, and controls the shaft of a variable capacitor 71 for varying the position thereof. Capacitor 71 may be of the type supplied by General Radio Company, model No. 1420–F. Capacitor 71 is connected to oscillator 15 to control the frequency thereof, and hence the frequency of oscillator 15 is controlled by the servo system when clutch 57 is engaged. A spring loaded brake 68 may be provided to ride against the surface of gear 69 to brake the capacitor when clutch 57 is disengaged.

When the output frequency of oscillator 15 has drifted over a period of time to such an extent that capacitor 71 has rotated sufficiently to drive frequency off instead of correcting same, the clutch 57 will be disengaged to interrupt AFC and adjust oscillator light 73 will be energized to indicate the requirement of a coarse manual adjustment for oscillator 15. This occurs when capacitor 71 has rotated sufficiently close to the allowable limits of its rotation to trip microswitch 75, thus opening the circuit through coil 55 and permitting A.C. current from terminal 77 to flow through adjust oscillator light 73. Upon coarse manual adjustment of oscillator 15, capacitor 71 may be reset in the appropriate position and microswitch 75 returned to the untripped position.

A panel switch 51, which may be located on the exterior of the unit for easy access, is designed to permit three types of operation of the frequency standard unit. They are continuous, off and timed. In the off position the circuit for coil 55 will be opened and hence clutch 57 disengaged. In addition the servo amplifier 34 will have all cut off bias removed and hence the servo system will be permitted to track phase. Because VLF broadcasting stations require maintenance, off periods occur and during these off periods phase lock, as determined by phase detector 29, can be lost. If it is desired to re-establish a phase lock as soon as the station returns to the air, the automatic frequency control switch should be left in the off position. After phase lock has been established, the AFC switch can then be placed in a timed position or continuous position as desired. When switch 51 is in timed position the circuit of coil 55 is completed through switch 78 which is controlled by a timer 79. Timer 79 may be set to open switch 78 during the period of the diurnal shift, thereby preventing automatic frequency control during this period of transient phase condition. When switch 51 is in the continuous position switch 78 is by-passed and automatic frequency control will be maintained on a constant basis as long as a signal is being received.

When a phase lock, as determined by phase detector 29, does not exist, but a signal is being received, switch 49 will close and if switch 51 is either in timed or continuous position, the servo system will not operate. Switch 51 may then be turned to the off position, removing the cut-off bias on servo amplifier 34 and starting the servo system to track phase. Once the phase tracking is finished, the AFC may be resumed. After a brief period of non-receipt of the transmitter signal, there may still exist a slight phase deviation for a short time, even though a phase lock as determined by phase detector 29 is established. To prevent automatic frequency control from taking place during this transient condition, a time delay 81 is provided in parallel with lock light 47 to control a further switch 80 in the clutch energizing circuit, and hence maintain clutch 57 in a disengaged state for a certain period of time. Thus when reception is resumed, time delay 81 will be activated to prevent AFC operation until sufficient time has elapsed for the servo system to reestablish the proper phase relationship.

As an addition to the servo unit, gear 83 may be driven by gear 37 at a reduction ratio equal to gear 39 to in turn drive a variable resistor 85 connected to voltage source 89. This will result in an analog indication at terminal 87 of the position of the servo mechanism, and appropriate instruments may be connected to output terminal 87 for additional checking of the operation of the system.

Whenever the phase angle is more or less than 90° in phase detector 27, the servo system drives the phase shifter 31 until the phase angle is 90° and no appreciable error voltage exists. At this point the phase correction has been made. However, if a frequency error exists, for example, if the local oscillator 15 is low in frequency, the phase error will build up and make the phase angle less than 90°. The servo motor will then turn the phase shifter and make the phase angle 90° once again. Since the AFC capacitor 71 is geared down from the phase shifter, it also turns, partly raising the frequency. This process repeats itself until the oscillator 15 is accurately on frequency. If the frequency had been high, the phase error would have built up in the opposite direction, causing the motor to run in reverse and lower the frequency. The resultant of this servo controlled phase shifter and variable capacitor is precise control of the locally generated frequency. When a signal is being received and the servo has operated to put the signals driving phase detector 29 in phase, the output of the phase detector 29 will insure that clutch 57 is engaged and the frequency is adjusted if necessary. When there is no signal, the clutch will disengage so that the local oscillator will not be driven off frequency. During the diurnal phase shift, automatic frequency control correction is prevented by timer 79.

It may therefore be seen that the invention provides a VLF receiver frequency standard unit in which automatic frequency control correction will not take place during periods of transient frequency conditions nor until a phase lock has been established by the servo system.

We claim:

1. A VLF receiver frequency standard unit having a locally generated output signal maintained on standard frequency according to the frequency of a received signal standard, including in combination, phase tracking means for resolving the phase of the locally generated signal to maintain such signal in a given phase relationship with the received signal standard, automatic frequency control means mechanically driven by said phase tracking means for varying the frequency of the locally generated signal to bring the same into accord with the frequency of the received signal standard, clutch means coupling said phase tracking means to said automatic frequency control means for rendering the latter inoperative at predetermined times to prevent defects in the received signal from influencing the frequency of the locally generated signal, and detector means controlling said clutch means to disengage same when the locally generated signal is out of the given phase relationship with the received signal by a predetermined amount.

2. A frequency standard unit for producing an output frequency of high accuracy according to the transmitted frequency standard of a very low frequency transmitter, including in combination, very low frequency signal receiving means producing an output signal of a given frequency, local oscillator means for producing an output signal substantially at said given frequency, first phase detector means for comparing the phase of the output signal of said local oscillator means with the phase of the output signal of said very low frequency signal receiving means, said first phase detector means producing an output in accordance with the variance of said output signals of said very low frequency signal receiving means and said local oscillator means from a given phase relationship, a servo system driven by said first phase detector means, said servo system including a phase resolver operable to bring the output signal of said local oscillator means into the given phase relationship with the output signal of said signal receiving means, said servo system further including a variable capacitor for controlling the frequency of said local oscillator means, clutch means for coupling said variable capacitor to said servo system and operative to decouple to prevent automatic frequency control, and second phase detector means for controlling the operation of said clutch means to disengage the same when the output signal of said local oscillator means is out of the given phase relationship with the output signal of said signal receiving means by a predetermined amount.

3. A frequency standard unit for producing output frequencies of high accuracy according to the transmitted frequency standard of a very low frequency transmitter, including in combination, very low frequency signal receiving means producing an output signal of a given frequency, local oscillator means producing an output signal substantially at said given frequency, first phase detector means for comparing the phase of the output signal of said local oscillator with the phase of the output signal of said signal receiving means, said first phase detector means producing an output in accordance with the variance from a given phase relationship, a servo system driven by said phase detector means, said servo system including a phase resolver operable to bring the output signal of said local oscillator means into the given phase relationship with the output signal of said signal receiving means, said servo system further including a variable capacitor for controlling the frequency of said local oscillator means to bring it to the frequency of said given frequency, clutch means for disengaging said variable capacitor from said servo system to prevent automatic frequency control, second phase detector means for controlling the operation of said clutch means to disengage same when the output signal of said local oscillator means is out of the given phase relationship with the output signal of said signal receiving means by a predetermined amount, and timer means connected to further control the operation of said clutch means to disengage same at preselected times.

4. A frequency standard unit for producing output frequencies of high accuracy according to the transmitted frequency standard of a very low frequency transmitter, including in combination, very low frequency signal receiving means producing an output signal of a given frequency, local oscillator means producing an output signal substantially at said given frequency, first phase detector means for comparing the phase of the output signal of said local oscillator means with the phase of the output signal of said signal receiving means, said first phase detector means producing an output in accordance with the variance from a given phase relationship, a servo system driven by said phase detector means, said servo system including a phase resolver operable to bring the output signal of said local oscillator means into the given phase relationship with the output signal of said signal receiving means, said servo system further including a variable capacitor for controlling the frequency of said local oscillator means to bring it to the frequency of said given frequency, clutch means for disengaging said variable capacitor from said servo system to prevent automatic frequency control, second phase detector means for controlling the operation of said clutch means to disengage same when the output signal of said local oscillator means is out of the given phase relationship with the output signal of said signal receiving means by a predetermined amount, timer means connected to further control the operation of said clutch means to disengage same at preselected times, and time delaying means connected to delay engagement of said clutch means upon initial receipt of an output signal from said signal receiving means, whereby said servo system is permitted to move the respective phases of signals from said local oscillator means and said signal receiving means relatively close to the given relationship before automatic frequency control is introduced.

5. A frequency standard unit for producing output frequencies of high accuracy according to the transmitted frequency standard of a very low frequency transmitter, including in combination, very low frequency signal receiving means producing an output signal of a given frequency, a local oscillator producing an output signal substantially at said given frequency, a first phase detector for comparing the phase of the output signal of said local oscillator with the phase of the output signal of said signal receiving means, said first phase detector producing an output according to the variance from a given phase relationship, a servo system driven by said first phase detector, said servo system including a phase resolver operable to bring the output signal of said local oscillator into the given phase relationship with the output signal of said signal receiving means, a variable capacitor connected to said local oscillator for controlling the frequency thereof, a magnetic clutch mechanically coupling said variable capacitor to said servo system to provide for automatic frequency control of said local oscillator, a second phase detector for comparing the phase of the output signal of said local oscillator with the phase of the output signal of said signal receiving means, said second phase detector producing an output according to the variance from the given relationship, the output of said first phase detector being at maximum value when the output of said second phase detector is minimum and vice-versa, relay means energizable by said second phase detector when the output thereof attains a given value, said relay means closing to energize said magnetic clutch to start automatic frequency control, timer means connected to further control operation of said magnetic clutch to disengage same at preselected times, and time delaying means connected to delay energization of said magnetic clutch upon actuation of said relay, whereby said servo system is permitted to move the respective phases of signals from said local oscillator means and said signal receiving means relatively close to the given relationship before automatic frequency control is introduced.

6. A frequency standard unit for producing output frequenices of high accuracy according to the transmitted frequency standard of a very low frequency transmitter, including in combination, very low frequency signal receiving means producing an output signal of a given frequency, a highly stable local oscillator producing an output signal substantially at said given frequency, a first phase detector for comparing the phase of the output signal of said local oscillator with the phase of the output signal of said signal receiving means, said first phase detector producing an output in accordance with the variance from a given phase relationship, a servo system driven by said first phase detector, said servo system including a phase resolver operable to bring the output signal of said local oscillator into the given phase relationship with the output signal of said signal receiving means, a variable capacitor connected to said local oscillator for controlling the frequency thereof, a magnetic clutch mechanically coupling said variable capacitor to said servo system to provide automatic frequency control, a second phase detector providing an output the strength of which increases as the output signal of said local oscillator and the output signal of said signal receiving means are brought closer to the given phase relationship by said phase resolver, an energizing circuit for said magnetic clutch, relay means connected to said second phase detector and operable to close said energizing circuit to engage said magnetic clutch when the output of said second phase detector reaches a predetermined value, a first indicator light connected in parallel with said energizing circuit and energizable upon operation of said relay means to indicate when said second phase detector is providing an output of the predetermined amount, timer means connected in said energizing circuit of said magnetic clutch and adapted to open at preselected times, and a second indicator light connected across said magnetic clutch in said energizing circuit and energizable when said magnetic clutch is energized by said relay means to indicate the existence of automatic frequency control.

References Cited by the Examiner

UNITED STATES PATENTS

| | | | |
|---|---|---|---|
| 2,794,120 | 5/57 | Hansell | 325—420 |
| 3,032,650 | 5/62 | Mathison | 325—421 |

DAVID G. REDINBAUGH, *Primary Examiner.*